United States Patent [19]  
Daman et al.

[11] 4,391,581  
[45] Jul. 5, 1983

[54] FLUID COOLED BURNER STRUCTURE

[75] Inventors: Lloyd W. Daman, Pemberville; Donald E. Shamp, Millbury, both of Ohio

[73] Assignee: Libbey-Owens-Ford Company, Toledo, Ohio

[21] Appl. No.: 214,350

[22] Filed: Dec. 8, 1980

[51] Int. Cl.³ .............................................. F23D 11/36
[52] U.S. Cl. .................................... 431/160; 266/270; 239/132.3
[58] Field of Search .......................... 431/160; 122/6.6; 266/270; 239/132, 132.1, 132.3

[56] References Cited

U.S. PATENT DOCUMENTS 1,731,248  10/1929  Mambourg .
2,077,169   4/1939  Green .
2,994,519   8/1961  Zellers, Jr. ...................... 431/160 X
3,100,461   8/1963  Werner ............................ 431/160 X
3,515,529   6/1970  Love et al. .
4,177,976  12/1979  Obata et al. ..................... 122/6.6 X Primary Examiner—Edward G. Favors  
Attorney, Agent, or Firm—Collins, Oberlin & Darr

[57] ABSTRACT

An improved burner for injecting fuel into the passages for heated combustion air connecting the checkers with the ports of a regenerative-type glass melting furnace. The ports are positioned somewhat above the level of the molten glass contained in the melting tank of the furnace. The burner comprises an elongated tubular structure having an angled tip portion for emitting fuel such as natural gas, which gas ignites in the presence of the heated combustion air and creates flames directed from the ports across the melting tank and slightly downwardly toward the surface of the glass. The angled tip portion is cooled by the flow of a heat absorbing medium such as water directed therearound, and is shaped in a manner to avoid the occurrence of stagnant areas in the tip portion so as to extend the life of the burner.

4 Claims, 6 Drawing Figures

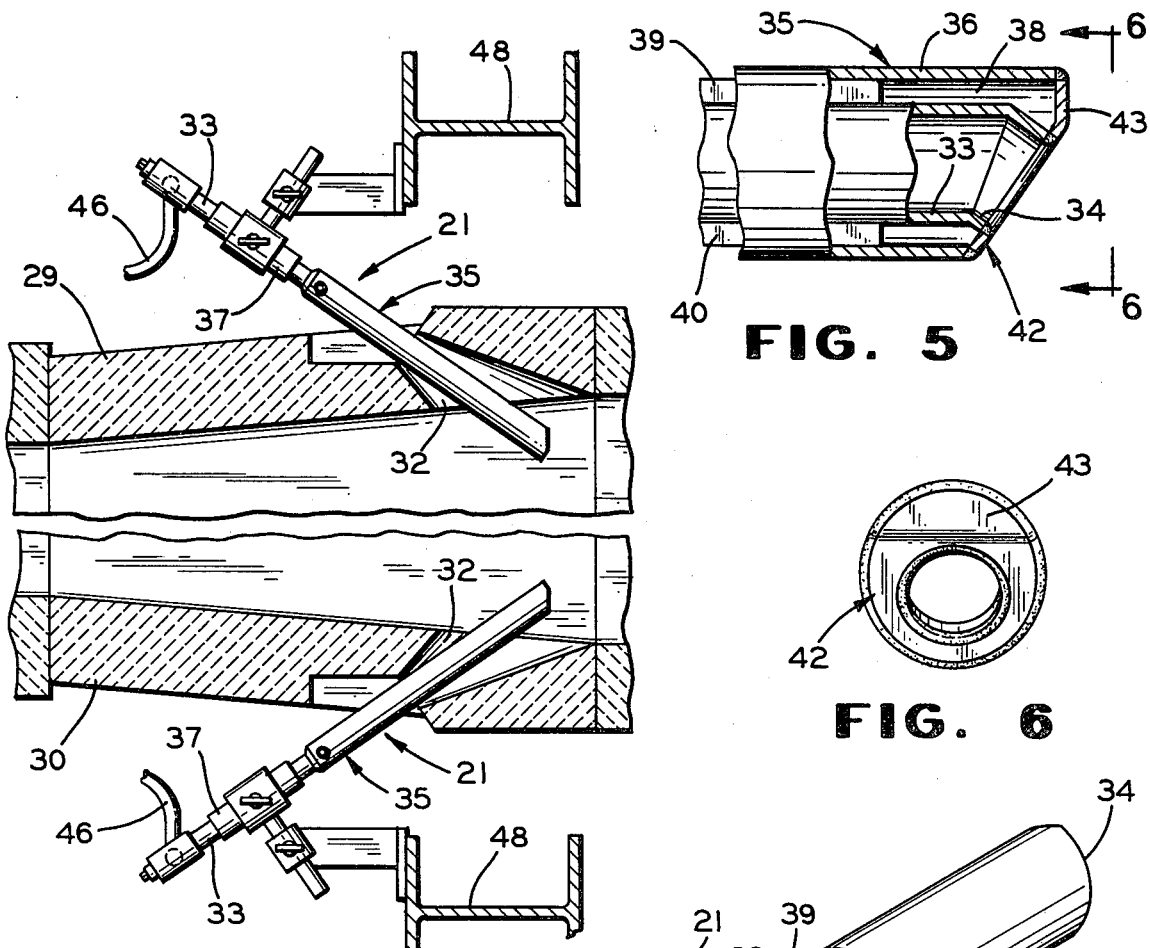
FIG. 5
FIG. 6
FIG. 3
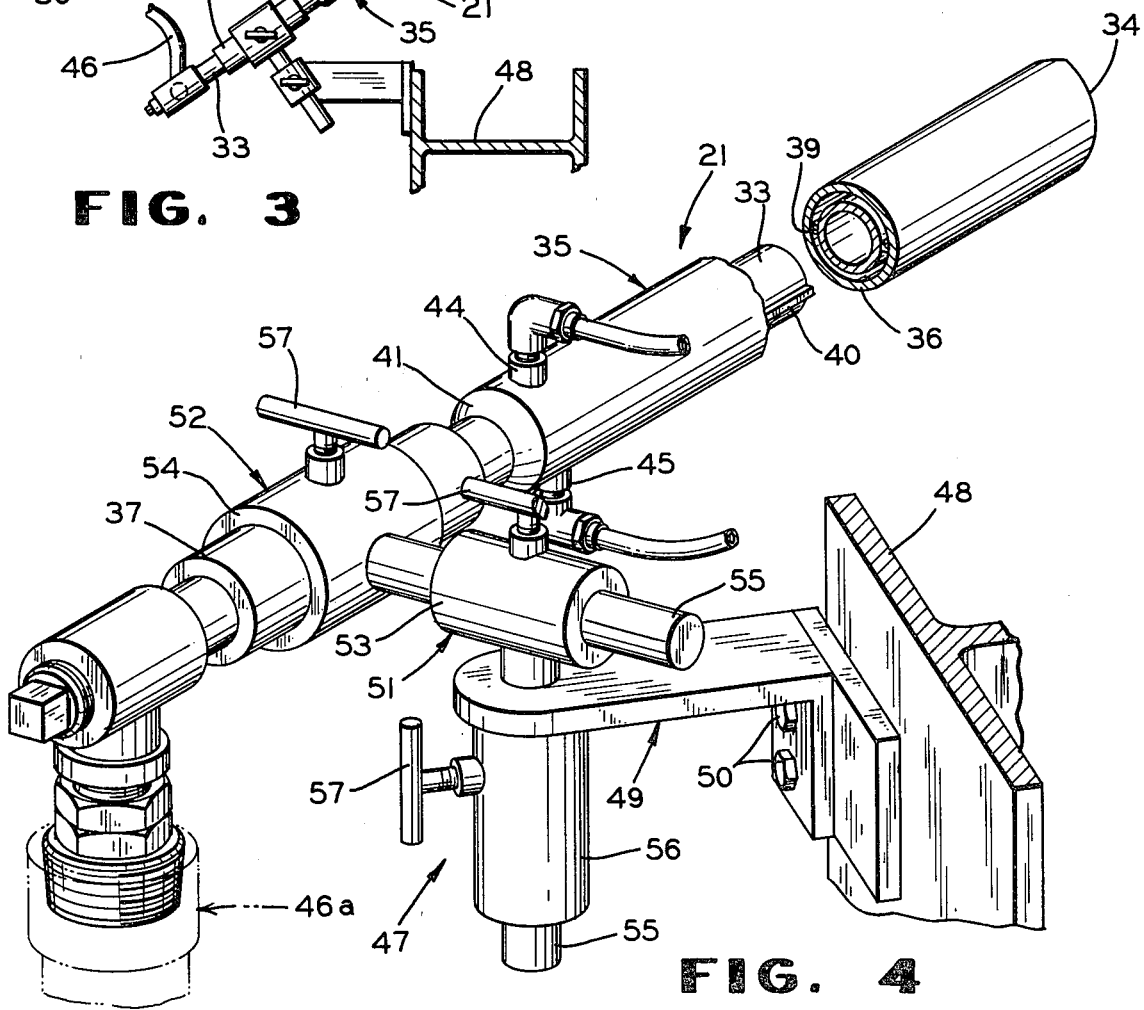
FIG. 4

FLUID COOLED BURNER STRUCTURE

BACKGROUND OF THE INVENTION

1. Field of the Invention

This invention generally relates to regenerative tank-type glass melting furnaces and, more particularly, to an improved fuel burner structure suitable for use in the ports thereof.

2. Description of the Prior Art

In a conventional regenerative tank-type glass melting furnace, raw materials are continuously supplied at one end of the tank and molten glass is removed from its other end. A series of ports is located along either side of the tank adjacent the feeding end in communication with associated regenerators. The furnace is alternately fired, first from one side by drawing combustion air through the regenerators on that side and injecting gas into the preheated combustion air for directing flames across the furnace. The products of combustion are withdrawn through the opposite ports for heating the associated regenerators. Periodically, the operation is reversed and flames are directed across the furnace from the ports on the other side.

In such glass melting furnace systems, it is conventional to provide fuel burners which are recessed within and fire through openings in refractory burner blocks in the side walls of the passages connecting the regenerators with the ports (see, for example, U.S. Pat. No. 2,077,169 issued on Apr. 13, 1937). Such blocks require periodic cleaning and accordingly, it has been found desirable to use water cooled burners which can be inserted directly into the passageway and do not require burner blocks.

Of course, water cooled fuel burners suitable for use in regenerative-type glass melting furnaces are generally known in the art (see, for example, U.S. Pat. No. 1,731,248 issued on Oct. 15, 1929). As disclosed in this patent, fuel and air are admitted into the refractory combustion chamber of the furnace side ports through separate inlets, with the fuel burner extending transversely across the air passage adjacent the port opening. The fuel burner generally comprises an elongated pipe provided with a series of longitudinally spaced fuel openings. The pipe is surrounded by a hollow cylindrical shell forming a water jacket, and the shell is provided with a slot opposite the fuel openings through which the fuel is emitted for forming a wide continuous flame under low pressure. A continuous flow of water is maintained through the hollow shell to protect the burner pipe from the high temperatures occurring in the ports. An inherent disadvantage of such burners is that they cannot readily be moved to adjust the direction of firing of the flames from the port in contrast to the aforementioned style of burners.

Attempts have been made in the past to provide water cooled fuel burners adapted to fire through side openings in the ports whereby the burners can be moved around to direct the firing across the tank without the use of burner blocks. However, the devices used heretofore have not been entirely satisfactory in that the water cooled jacket of the burner included stagnant areas of low coolant flow, resulting in hot spots in the jackets which ultimately developed leaks and sprayed water on the refractory blocks of the ports, causing the refractory to spall off and be carried into the molten glass.

SUMMARY OF THE INVENTION

Briefly, the present invention comprises an elongated fuel supply tube having an angularly disposed outlet segment. The portion of the supply tube which is to be exposed to high temperatures, is surrounded by a concentric tube with the annular space therebetween being closed off at the ends so that it may be utilized as a water cooled jacket. Oppositely disposed vanes extend longitudinally along the annular passage to divide the jacket into inlet and outlet portions, the vanes being located so as to be at the sides of the burner assembly when it is installed in operative position. The burner assembly is adapted to be inserted through openings in the sides of the tunnel connecting the regenerator and port, with several inches of its water cooled portion extending into the interior of the tunnel and its angularly disposed outlet directed toward the interior of the furnace. Fuel is admitted to the fuel supply tube through a nozzle at the rear to be discharged through the water cooled end for ignition within the furnace.

OBJECTS AND ADVANTAGES

An object of this invention is to provide a fuel burner for use in a continuous glass melting furnace which has components that are not subject to overheating so as to become damaged during extended periods of use.

Another object of this invention is to provide a liquid cooled fuel burner which is constructed so as to avoid formation of stagnant regions in the flow path of the coolant.

Still another object of the invention is to provide a fuel burner which is simple in construction, easy to manufacture and assemble, and readily installed, replaced or adjusted in the furnace.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 3 is an enlarged, fragmentary view taken substantially along line 3—3 in FIG. 2;

FIG. 4 is a broken perspective view of the burner embodying the invention;

FIG. 5 is an enlarged, fragmentary, side elevation, partly in section, of the angled tip portion of the burner illustrated in FIG. 4; and FIG. 6 is an end view of the burner tip illustrated in FIG. 5.

DESCRIPTION OF THE PREFERRED EMBODIMENT

Figure 1:
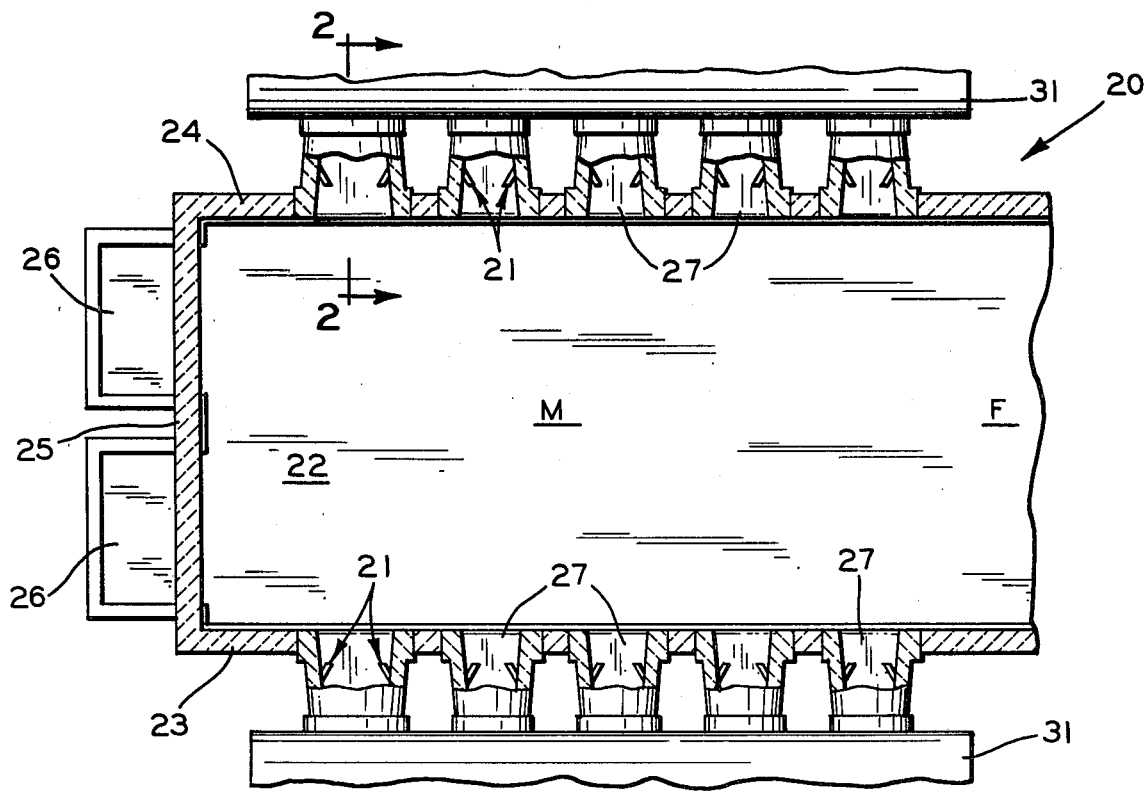
FIG. 1 is a fragmentary, diagrammatic plan view of a regenerative tank-type glass melting furnace embodying the invention.

With reference now to the drawings and more particularly to FIG. 1, there is illustrated a continuous tank-type regenerative glass melting furnace 20 for which the present invention is especially suited. It will be appreciated, however, that the novel burners disclosed herein, and designated in their entirety by the reference numeral 21, may have utility in applications other than the continuous tank-type glass furnace shown.

Generally, such a glass melting furnace 20 includes a longitudinally extending tank 22 having opposed side walls 23 and 24, an end wall 25, and conventional batch feeding extensions or doghouse areas 26. Raw glass making materials or batch, and cullet or scrap glass, are introduced into the doghouses 26 by feeder devices (not shown) and reduced in a molten state within the furnace melting zone M. Thereafter the molten glass flows through a refining zone F and contiguous cooling zone, and the properly conditioned molten glass is withdrawn from the opposite or exit end (not shown) of the furnace by appropriate forming apparatus.

Figure 2:
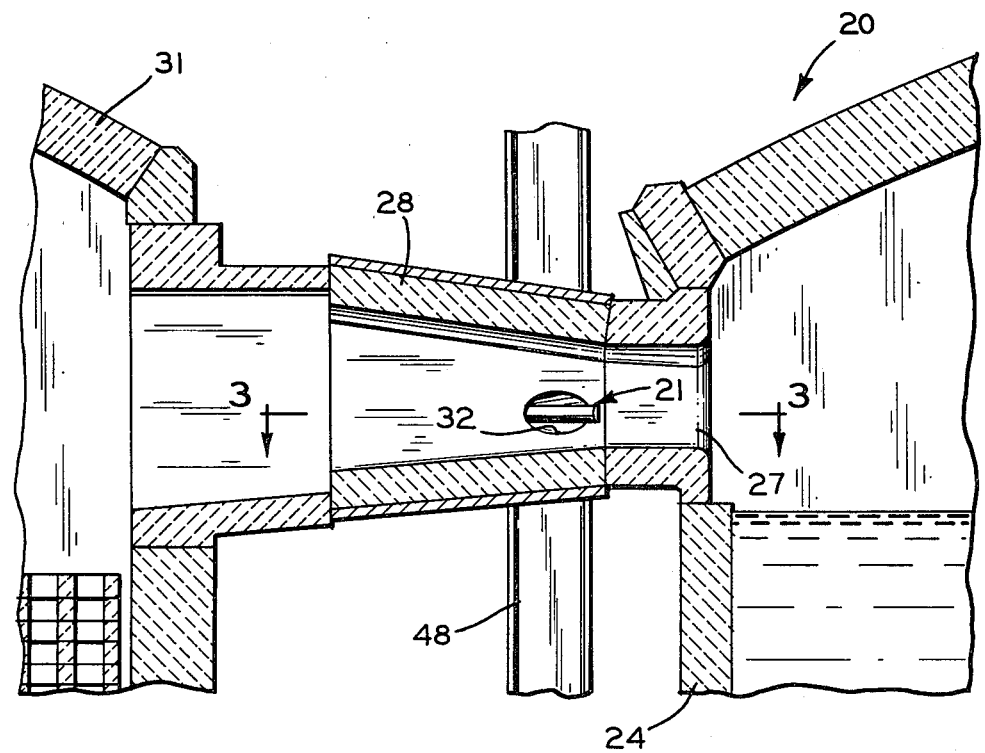
FIG. 2 is an enlarged, fragmentary, cross-sectional view taken substantially along line 2—2 in FIG. 1.

Heat for reducing the batch to molten consistency within the melting zone M is provided by the novel burners 21 which discharge combustible gases into streams of preheated combustion air. The gases ignite in the presence of the heated air and the resulting hot flames and products of combustion are directed through ports 27 opening into the melting zone of the tank 22 above the surface of the glass flowing therethrough. As is common with furnaces of this type, the ports 27 are arranged at spaced intervals along each side wall 23 and 24 of the furnace 20, with the ports being connected by tunnel structures 28 (see FIG. 2) having opposed side walls 29 and 30 (see FIG. 3) to regenerators 31 also located along each side wall 23 and 24. The regenerators, of course, supply the heated combustion air for the burners 21.

As best illustrated in FIG. 3, the burners 21 project through suitable openings 32 which are provided in the side walls 29 and 30 of each tunnel 28 adjacent the ports 27.

Referring generally to FIGS. 4 and 5, each novel burner 21 comprises an elongated central tube 33 having an angularly disposed tip portion 34 through which fuel such as natural gas is supplied. A water cooled jacket 35 comprising a concentric outer tube 36 covers at least the portion of the inner tube 33 extending into the air passage tunnels 28. A mounting collar 37 is provided on the rear portion of the tube 33 for movably supporting the burner 21 in the wall opening 32 of the air passage tunnels 28 as will be hereinafter described.

More specifically, the outer concentric tube 36 is arranged around the angled tip portion 34 of the central tube 33 and extends therefrom to a point beyond the outside of the side walls 29 and 30 of the tunnels 28 (see FIG. 3), with the annular space 38 between the tubes being closed off at its ends. Oppositely disposed vanes 39 and 40 extending longitudinally along the annular space 38 between the central and outer tubes to a point short of the angled tip portion 34 divide the annular space into inlet and outlet chambers. In order to achieve the desired pattern of coolant flow at the angled tip portion, the vanes 39 and 40 are positioned along the horizontal sides of the central tube 33.

The chamber or space 38 between the two tubes is closed off at its outer end by an annular plate 41 welded to the external end of the outer pipe 36 and the surface of the central tube 33. At the opposite end a specially configured annular end plate 42 is welded to the end of the angled tip portion 34 of the inner tube and the angled end of the outer tube 36.

As best illustrated in FIGS. 5 and 6, the end plate 42 does not extend planarly across the angled end of the tip portion 34, but instead is bent to have a portion 43 extending perpendicularly to the longitudinal axis of the outer tube 36, while the remainder is normal to the axis of the angled tip portion. Not only does this construction eliminate the acute angle and resulting stagnant area in the coolant which would be formed at the juncture with the tube 36 if the plate 42 were planar, but it also furnishes a better foundation for the welding seam, reducing the possibility of a leak developing at the weld during use.

Referring now to FIG. 4, coolant, such as water, is admitted to the chamber through an inlet port 44 to flow along the top half of the chamber to the angled tip end, and then return through the lower portion of the chamber for removal through a discharge port 45. Because of the flow pattern created by the novel configuration at the inner end of the annular space 38, the coolant sweeps across the surface of the outer tube 36 and end plate 42 in this region so as to prevent the creation of so-called hot spots which can result in leaks in the water cooled jacket 35.

Fuel is admitted from a supply line 46 (FIG. 3) at the external end of the burner tube 33 through a readily detachable metering nozzle assembly 46a. The fuel is discharged through the angularly disposed water cooled end of the burner 21 for ignition within the ports 27. Accordingly, the BTU rating of the burners 21 may be changed by merely exchanging the nozzle 46a for a nozzle of different size, thus eliminating the task of removing and replacing the total burner assembly for changing the BTU rating of the burner.

Still referring to FIG. 4, each burner 21 is supported in an adjustment bracket, designated in its entirety by the reference numeral 47 which is conveniently mounted on the structural framework of the furnace, such as on a column 48 thereof.

Generally, the adjustment bracket 47 comprises an anchor bracket 49 attached to the column 48 as by cap screws 50 or the like, an intermediate bracket 51 which is movably supported by the anchor bracket 49, and a burner support bracket 52 which is movably supported by the intermediate bracket 51. More specifically, the intermediate bracket 51 and the burner support bracket 52 are similar T-shaped members which include sleeves 53 and 54, respectively, each sleeve being provided with a pivot stud 55. The anchor bracket 49 is provided with an upstanding sleeve 56 which positionably supports the pivot stud 55 of the intermediate bracket 51, while the sleeve 53 thereof positionably supports the pivot stud 55 of the burner bracket 52. The sleeve 54 positionably supports the mounting collar 37 of the burner 21. Each of the sleeves 53, 54 and 55 of the bracket members is provided with a T-handle set screw 57 for locking the associated pivot stud or collar, and hence the burner 21, in a desired position.

It is to be understood that the form of the invention herewith shown and described is to be taken as an illustrative embodiment only of the same, and that various changes in the shape, size and arrangement of the parts may be resorted to without departing from the spirit of the invention.

We claim:

1. A fuel burner adapted to extend through an opening in a wall of the tunnel connecting a port with the checkers of a regenerative-type glass melting furnace comprising:
   a. an elongated fuel supply tube having an open angled end portion for emitting fuel therefrom;
   b. a tubular jacket concentrically surrounding a portion of said fuel supply tube and extending from said angled end portion;

c. first and second closure members for closing the ends of the space between the fuel supply tube and said jacket for forming a chamber therebetween, said first closure member having a first planar portion with an aperture therein aligned with the open angled end of said fuel supply tube and extending perpendicularly thereto and a second planar portion extending perpendicular to a portion of said tubular jacket;

d. a pair of longitudinal vanes oppositely disposed within the space between said fuel supply tube and said jacket and extending from said second closure member to a point adjacent to but spaced from said first closure member; and e. means for circulating a coolant within the chamber of said jacket.

2. A fuel burner for a regenerative type glass melting furnace as claimed in claim 1, including inlet and outlet ports disposed adjacent said second closure member for passing a cooling medium through the space between said fuel supply tube and said jacket.

3. A fuel burner for a regenerative type glass melting furnace as claimed in claim 1, including a collar attached to said supply tube for mounting said fuel burner in the furnace.

4. A fuel burner for a regenerative type glass melting furnace as claimed in claim 1, including a metering nozzle which is detachably secured to one end of said fuel supply tube.

* * * * *